E. NEWELL.
BAND SAW GUIDE DISK.
APPLICATION FILED SEPT. 26, 1919.

1,360,564.

Patented Nov. 30, 1920.

WITNESSES
J. Herbert Bradley.

INVENTOR
Edgar Newell
By Jno. S. Green
His Atty.

UNITED STATES PATENT OFFICE.

EDGAR NEWELL, OF IRWIN, PENNSYLVANIA.

BAND-SAW GUIDE-DISK.

1,360,564.  Specification of Letters Patent.  Patented Nov. 30, 1920.

Original application filed August 8, 1918, Serial No. 248,975. Divided and this application filed September 26, 1919. Serial No. 326,476.

*To all whom it may concern:*

Be it known that I, EDGAR NEWELL, a citizen of the United States, and a resident of Irwin, in the county of Westmoreland and State of Pennsylvania, have made a new and useful Invention in Band-Saw Guide-Disks, of which the following is a specification.

My invention relates to band saw guides and this application covers particular features of the saw guide described in my copending application, Serial No. 248,973. This invention comprises a wheel or disk and the mounting for same adapted to offer a bearing for the back of a band saw during the latter's passage through a guide of the type shown in the above mentioned application.

The objects of my invention are to mount a bearing disk so as to utilize commercial ball bearing sets, to provide a disk that is reversible and that may be easily reversed or replaced and to eliminate friction by distributing the pressure of the saw blade to the ball bearings so as to prevent binding or undue strain. I also desire to provide a lubricant chamber and passage for the ball bearings and to exclude dirt from the same.

Figure 1:
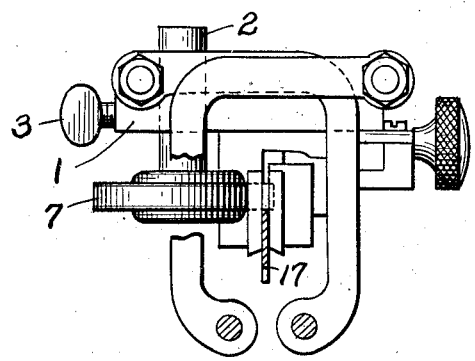
Figure 2:
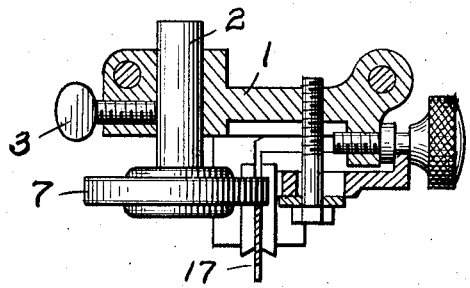
Figure 3:
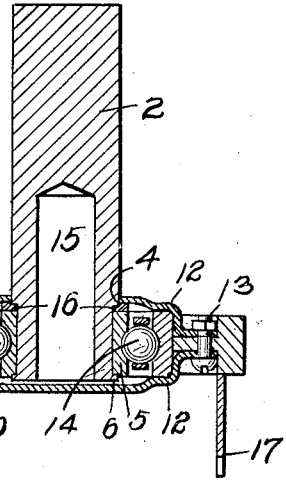
Figure 4:
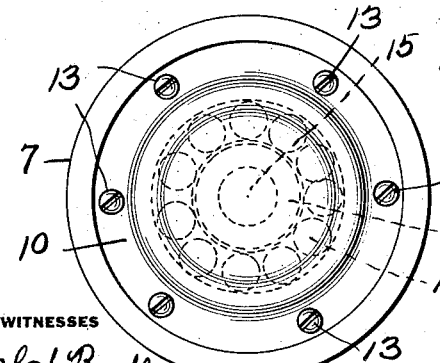

These and other objects and advantages are attained by the construction detailed in the accompanying drawings in which Figure 1 is a plan of a saw guide to which my bearing disk is applied; Fig. 2 is a horizontal section through the guide showing the manner of assembling the bearing disk therewith; Fig. 3 is an enlarged section of the bearing disk and its mounting and Fig. 4 is an elevation of same.

The support member 1 of the band saw guide device is provided with an opening for the bearing disk spindle 2 which is adjustable longitudinally in the opening and may be secured in any position by a thumbscrew 3. Near the outer end of spindle 2 is a circumferential shoulder 4 and beyond this the spindle is turned down to snugly fit the interior of the inner race 5 of a commercial ball bearing set. I have shown a single row ball bearing of common type but obviously other similar types may be similarly used. The outer end of spindle 2 is swaged to form a retaining shoulder 6 corresponding to shoulder 4.

The saw bearing is a ring shaped disk having a comparatively heavy rim 7 and a thin plate 8 having a round hole which fits closely over the outer circumference of the external race 9 of the ball bearing. I do not rely upon this fit to maintain the assembly of the disk and bearing but rather upon the coöperating action of the sheet metal covers 10 and 11 which are bolted to the disk plate and each other near their circumferential edges. Each cover has an offset portion 12 which grips outer race 9 when bolts 13 are tightened.

Covers 10 and 11 besides holding the disk in position, form protecting shields for ball bearings 14 between races 5 and 9. The end of spindle 2 is recessed at 15 to provide a lubricant receptacle and this receptacle or pocket, while open to the bearings, is closed to the atmosphere by outer cover 10. The metal covers surround the balls and their races except where cover 11 is pierced to admit spindle 2. At this point a strip 16 of packing material is preferably inserted which completes the dust tight, lubricant retaining inclosure, enabling the bearing to operate without difficulty in the unfavorable atmosphere about a band saw.

The band saw for which the disk forms a bearing is indicated at 17 and it will be noted that any pressure exerted on rim 7 by the saw blade is transmitted by covers 10 and 11 to race 9. When the rim 7 is worn on the saw supporting side, bolts 13 and cover 10 may be removed and the disk reversed or a new disk may be applied to the same set of bearings, when cover 10 may be replaced and bolted to cover 11.

My device is compact, economical and efficient. It is adapted to utilize any standard ball bearing set without special races or complicated race attaching means and to protect the balls from undue wear or abrasion by excluding foreign matter from the races and retaining lubricant therein.

I claim:—

1. In combination, a spindle, a standard, anti-friction bearing unit including an inner race mounted on said spindle, a freely rotating outer race and anti-friction elements between said races, and a reversible member detachably secured to said outer race, provided with oppositely facing surfaces each adapted to form a bearing for the blade of a band saw.

2. In combination, a spindle, a standard, anti-friction bearing unit mounted thereon and including a freely rotating race member, a reversible, saw bearing disk, and coöperating sheet metal clamps which are adapted to detachably secure said disk to said race member.

3. In combination, a spindle, a standard ball bearing set including an inner race mounted on said spindle, an outer race and balls retained by said races, and a tool supporting element having a centripetal flange and which is detachably secured to said outer race by coöperating members which grip said outer race and said flange between them.

4. In a thrust support for a band saw, a saw supporting annulus, a spindle having a lubricant holding recess in its end, a standard, ball bearing set including an inner race mounted upon the periphery of said spindle adjacent said recessed end and a freely rotating outer race, a sheet metal member covering said end and the adjacent face of said set, a sheet metal member surrounding the periphery of said spindle and covering the opposite face of said set, each of said members maintaining a peripheral contact with said outer race and both coöperating to mount said annulus upon said outer race.

In testimony whereof I have hereunto subscribed my hand this 19th day of September, 1919.

EDGAR NEWELL.